United States Patent [19]
Kaneda et al.

[11] Patent Number: 5,633,756
[45] Date of Patent: May 27, 1997

[54] IMAGE STABILIZING APPARATUS

[75] Inventors: Naoya Kaneda, Chigasaki; Kazuhiro Noguchi, Kawasaki, both of Japan

[73] Assignee: Canon Kabushiki Kaisha, Tokyo, Japan

[21] Appl. No.: 600,649

[22] Filed: Feb. 16, 1996

Related U.S. Application Data

[63] Continuation of Ser. No. 404,852, Mar. 17, 1995, abandoned, which is a continuation of Ser. No. 968,314, Oct. 29, 1992, abandoned.

[30] Foreign Application Priority Data

Oct. 31, 1991 [JP] Japan .................................. 3-311448
Nov. 29, 1991 [JP] Japan .................................. 3-339365

[51] Int. Cl.$^6$ ................................. G02B 27/64
[52] U.S. Cl. .................... 359/554; 359/557; 396/55
[58] Field of Search .......................... 359/554, 555, 359/556, 557; 354/70, 410, 430; 358/222

[56] References Cited

U.S. PATENT DOCUMENTS

| | | |
|---|---|---|
| 4,970,540 | 11/1990 | Vasey et al. . |
| 5,153,633 | 10/1992 | Otani . |
| 5,172,233 | 12/1992 | Yoshihara et al. .................... 359/554 |
| 5,181,056 | 1/1993 | Noguchi et al. ....................... 354/70 |
| 5,243,462 | 9/1993 | Kobayashi et al. . |

FOREIGN PATENT DOCUMENTS

| | | |
|---|---|---|
| 0206668 | 12/1986 | European Pat. Off. . |
| 0286922 | 10/1988 | European Pat. Off. . |
| A0396981 | 11/1990 | European Pat. Off. . |
| 0396981 | 11/1990 | European Pat. Off. . |
| 0039634 | 2/1992 | Japan ................................ 359/554 |
| 0215625 | 8/1992 | Japan ................................ 359/554 |

*Primary Examiner*—Edward K. Look
*Assistant Examiner*—Christopher Verdier
*Attorney, Agent, or Firm*—Fitzpatrick, Cella, Harper & Scinto

[57] ABSTRACT

A blur suppressing apparatus includes a blur suppressing device movable in an optical path, for suppressing a blur of an image transmitted along the optical path. A mechanical lock is provided for mechanically locking the blur suppressing device, and an electrical lock is also provided for electrically locking the blur suppressing device. An operation device is provided for operating the mechanical lock and the electrical lock. A control device causes the electrical lock to at least be activated or released independently from the mechanical lock in accordance with the operational state of the operation device.

74 Claims, 12 Drawing Sheets

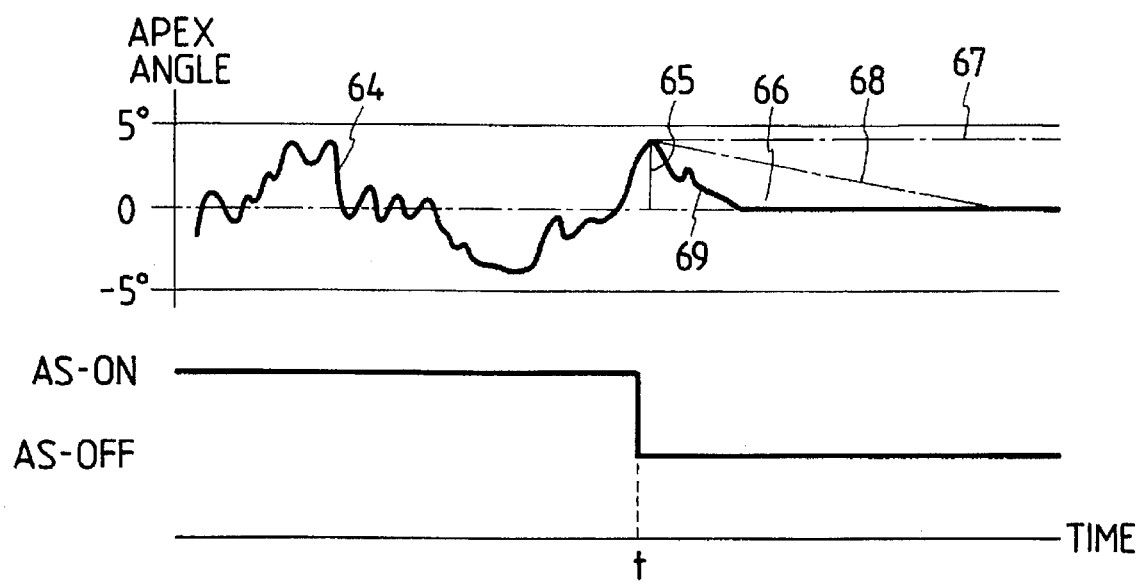
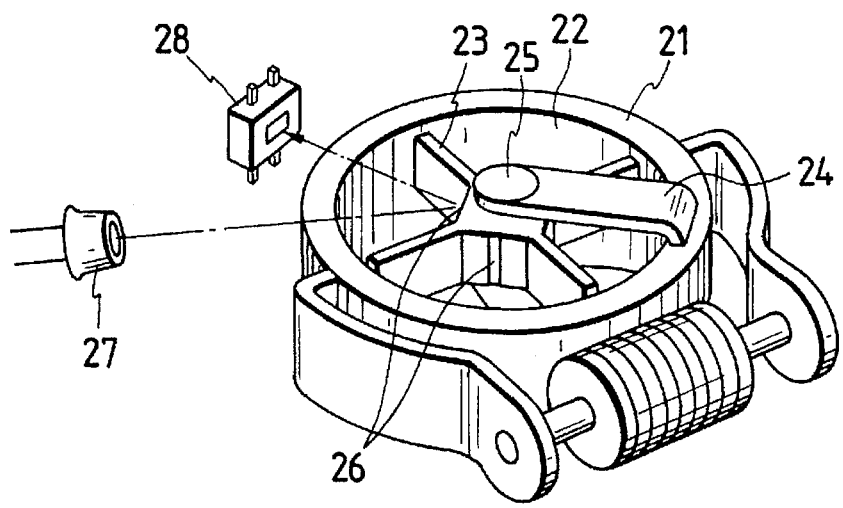

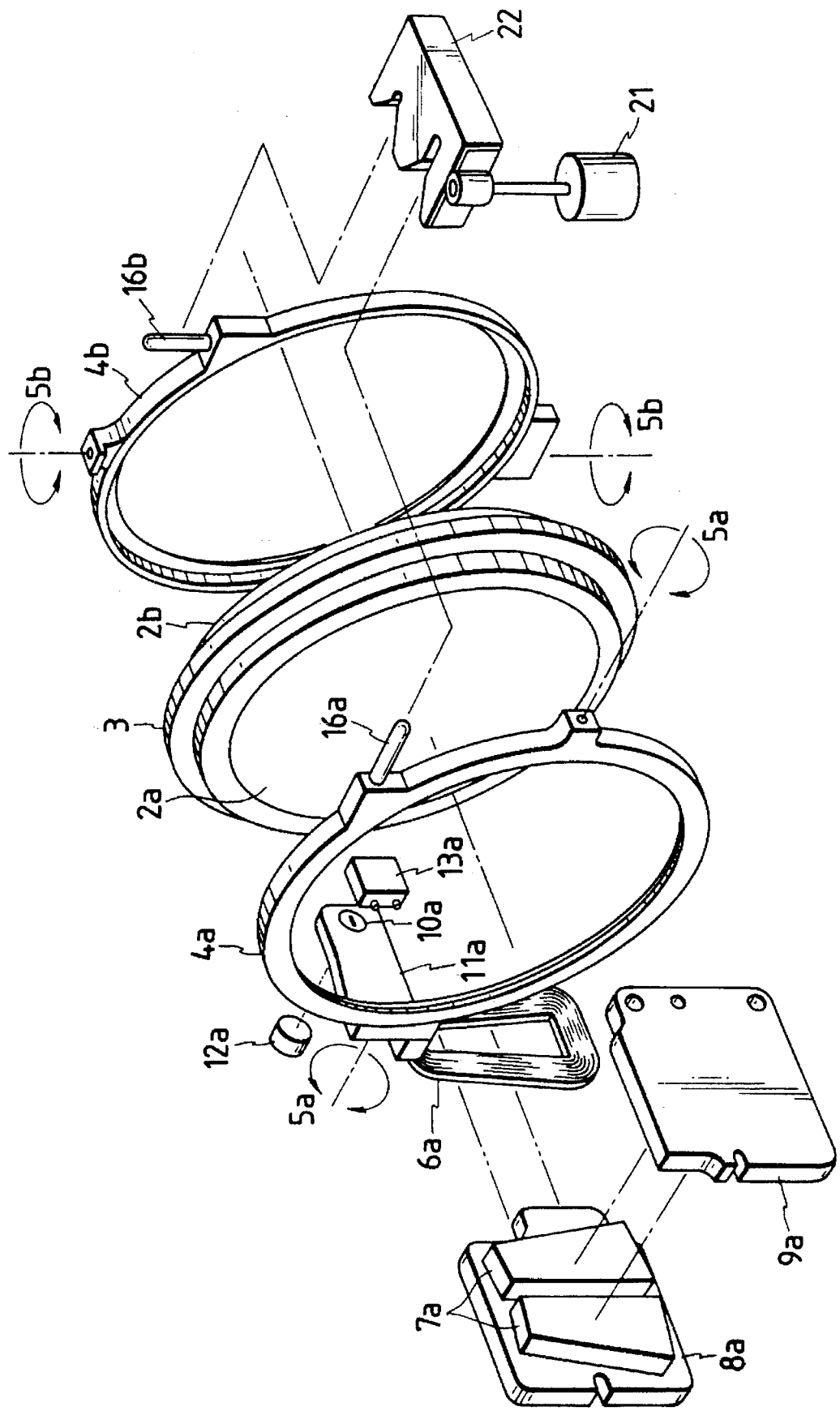

FIG. 10A PRIOR ART
FIG. 10B PRIOR ART
FIG. 10C PRIOR ART
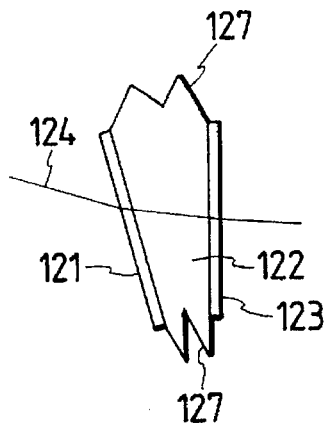
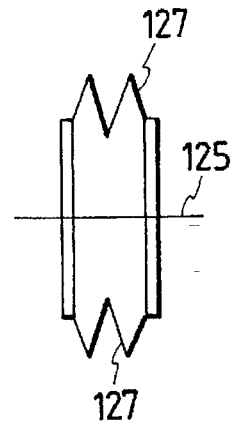
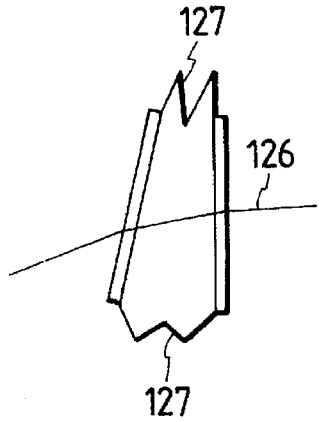
FIG. 11A PRIOR ART
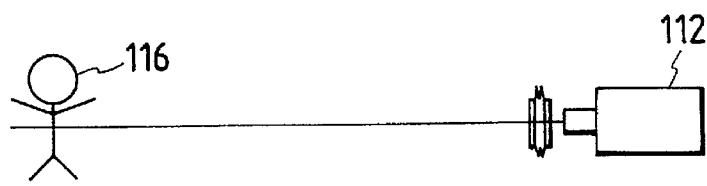
FIG. 11B PRIOR ART
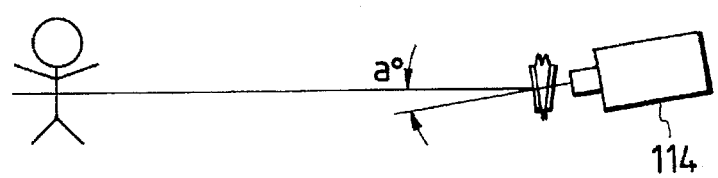

IMAGE STABILIZING APPARATUS

This application is a continuation of application Ser. No. 07/968,314 filed Oct. 29, 1992, now abandoned.

This application is a continuation of application Ser. No. 08/404,852 filed Mar. 17, 1995, now abandoned.

BACKGROUND OF THE INVENTION

1. Field of the Invention

The present invention relates to an image stabilizing apparatus comprising a plurality of optical blur suppression means moved to deflect beams and perform blur suppression, and a plurality of holding means for holding the optical blur suppression means at predetermined positions.

2. Related Background Art

In recent years, image recording devices such as a silver camera and a video camera have been automated, and various functions such as an automatic exposure control means and an automatic focus control means have been put into practice.

In particular, an image recording device such as a video camera generally uses a zoom lens as a photographic lens, and the zoom ratio of the zoom lens is increasing year by year.

On the other hand, the sizes of the image recording devices are also decreasing, and even a compact camera which can be operated by one hand has been introduced on the market along with a reduction in size of the image recording frame size and developments of high-density integration techniques and compact recorder mechanical chassis.

Disturbing frame blurring caused by hand vibrations of a photographer often occurs in use of a compact video camera having such a zoom lens. Various blur suppressing apparatuses have been proposed to eliminate this blurring and obtain a stable frame. Such a blur suppressing apparatus can greatly suppress hand vibrations generated in photography even with a tripod on a ship or motor vehicle as well as the disturbing frame blurring caused by hand vibrations.

This blur suppressing apparatus includes at least a vibration detection means for detecting a blur and a vibration suppression means for suppressing the image blur so as to prevent frame blurring in accordance with information of the detected vibration.

Examples of the vibration detection means are an angular accelerometer, an angular speedometer, and an angular displacement meter. Examples of the blur suppression means are a method using a variable apex angle prism (to be described in detail later) proposed by the present applicant and a method of sequentially changing (tracking) an extraction position to a position (at which the blur is suppressed) in a video camera arranged such that an area used as an actual frame is extracted from the obtained photographic frame information.

The former method as the blur suppression means using the variable apex angle prism or any other optical means to eliminate the blur of an image to be focused on an image pickup element is called an optical correction means, whereas the latter method as the blur suppression means for electronically processing image information including a vibration is called an electronic correction means.

The optical correction means can generally suppress a vibration within the vibration angle range of the camera regardless of the focal length of the lens. Therefore, the image blur can be eliminated even at a large focal length on the telephoto side of the zoom lens to a negligible degree in practice. However, the optical correction means undesirably results in a bulky camera.

To the contrary, the electronic correction means has a constant suppression ratio with respect to, e.g., the vertical size of the frame, on the frame. For this reason, when the focal length on the telephoto side is increased, the blur suppression performance is degraded. The electronic correction means is advantageously employed for a compact arrangement.

FIGS. 9A to 9C are views for explaining the relationship between the focal length and the camera vibration angle with respect to object positions on the frame.

Referring to FIG. 9A, an optical axis 113 is obtained when a camera is located at a position 112. In this case, the face of a person 111 as an object to be photographed is located at almost the center of the frame. Assume that the camera is rotated through an angle a by a hand vibration. At this time, a camera position 114 and its optical axis 115 are set.

FIGS. 9B and 9C show frame positions at the camera positions 112 and 114. More specifically, FIG. 9B shows a state at the telephoto end of a zoom lens, and FIG. 9C shows a state at the wide-angle end of the zoom lens. Objects 116 are located at frame positions in these states, as shown in FIGS. 9B and 9C. Frames 117 and 119 are set at the camera position 112, whereas frames 118 and 120 are set at the camera position 114.

As is apparent from FIGS. 9A to 9C, frame blurring at a large focal length of the lens is worse than that at a small focal length if the camera is vibrated through the same angle a. Therefore, an optical means such as a variable apex angle prism is effective as a blur suppression means to be combined with a lens having a large focal length at the telephoto end.

FIGS. 10A to 10C show the arrangement of a variable apex angle prism.

Referring to FIGS. 10A to 10C, the variable apex angle prism comprises glass plates 121 and 123 and a bellows portion 127 made of, e.g., polyethylene. A transparent liquid 122 consisting of, e.g., silicone oil is sealed inside the space defined by the glass plates 121 and 123 and the bellows portion 127.

FIG. 10B shows a state in which the two glass plates 121 and 123 are parallel to each other. In this case, the incident angle of a ray on the variable apex angle prism is equal to the exit angle of the ray. However, when the glass plates 121 and 123 are inclined with each other at angles shown in FIGS. 10A and 10C, rays 124 and 126 are diffracted at given angles.

When the camera is inclined by a hand vibration or the like, the angle of the variable apex angle prism arranged in front of the lens is controlled so that the ray is diffracted by an amount corresponding to the inclination angle of the camera, thereby eliminating the image blur.

FIGS. 11A and 11B show a blur suppression operation. FIG. 11A shows a state wherein the glass plates of the variable apex prism are parallel to each other, and the ray corresponds to the head of the object 116. As shown in FIG. 11B, the variable apex angle prism is driven by an amount corresponding to the angle a to diffract the ray, so that the photographic optical axis is constantly aligned with the head of the object 116.

FIG. 12 is a view showing the practical structure of a variable apex angle prism unit including the variable apex angle prism, actuators for driving the variable apex angle prism, and apex angle sensors for detecting the angular state of the variable apex prism.

Since actual vibrations occur in all directions, the front and rear glass surfaces are arranged to be rotatable about rotational axes shifted by 90°. In this case, suffixes a and b represent constituent parts representing these two rotational directions, and the same numbers denote the same functions. Some parts represented by the suffix b are not illustrated.

A variable apex angle prism 141 includes the glass plates 121 and 123, the bellows portion 127, and a liquid. The glass plates 121 and 123 are integrally mounted on holding frames 128a and 128b through an adhesive or the like. The holding frames 128a and 128b constitute rotational axes 133a and 133b with fixed parts (not shown) and are rotatable about the rotational axes 133a and 133b, respectively. The rotational direction of the rotational axis 133a is shifted from that of the rotational axis 133b by 90°. A coil 135a is integrally mounted on the holding frame 128a. Magnets 136a and yokes 137a and 138a are mounted on a fixed portion (not shown). When a current is supplied to the coil 135a, the variable apex angle prism 141 is pivoted about the rotational axis 133a. A slit 129a is formed at the distal end of an arm 130a integrally extending from the holding frame 128a, thereby constituting the apex angle sensor between a light-emitting element 131a such as an IRED and a light-receiving element 142a such as a PSD, which elements are arranged on a fixed portion.

FIG. 13 is a block diagram showing an image stabilizing apparatus having the variable apex angle prism 141 as a blur suppression means in combination with a lens.

Referring to FIG. 13, this image blur preventive apparatus includes the variable apex angle prism 141, apex angle sensors 143 and 144, amplifiers 153 and 154 for amplifying outputs from the apex angle sensors 143 and 144, a microcomputer 145, vibration detectors 146 and 147 each including an angular accelerometer, and actuators 148 and 149 including parts from the coil 135a to the yoke 138a. The variable apex angle prism 141 is located in front of a lens 152.

The microcomputer 145 determines currents to be supplied to the actuators 148 and 149 to control the variable apex angle prism 141 at an optimal angle for eliminating the blur in accordance with the angular states detected by the apex angle sensors 143 and 144 and the detection results from the vibration detectors 146 and 147.

Note that the main components are constituted by pairs of blocks to independently perform control operations in two directions perpendicular to each other.

The conventional image stabilizing apparatus using the variable apex angle prism as the blur suppressing means has been described above. As another example comprising an optical correction means, U.S. Ser. No. 516,303 (EP Provisional Publication No. 396,981) by the present applicant discloses an image blur preventive apparatus having a lens group which is arranged in front of the photographic lens and swung by the inertia.

When this optical correction means is used, the chromatic aberration tends to increase when the correction angle of the optical axis is increased. In order to prevent degradation of the image quality in an inoperative state of the image blur preventive apparatus, the optical correction means must be kept held at a position where chromatic aberration does not occur (minimum). This position is defined as a position where the correction angle of the optical axis is 0°.

The apparatus employing the variable apex angle prism as the blur suppressing means is taken into consideration again.

As shown in FIG. 9B, the variable apex angle prism must be set so that the two glass plates 121 and 123 are parallel to each other and is perpendicular to an optical axis 125 in an inoperative state of the blur preventive apparatus.

The following two methods are available to hold the variable apex angle prism in this state.

1) The actuators are energized to keep the two glass plates parallel to each other.

2) The two glass plates are mechanically kept parallel to each other.

According to the method 1), in the block diagram of FIG. 13, outputs from the vibration detectors 146 and 147, fetched by the microcomputer 145, are disabled. A feedback loop is formed such that a position corresponding to the parallel state of the two glass plates is given as a target position.

FIG. 14 is a block diagram for realizing control by the method 1). For the sake of descriptive simplicity, an arrangement in only one direction is illustrated.

When a photographer selects an operative/inoperative state of the blur preventive apparatus, this selection result is fetched to the microcomputer 145. In the operative state, a target position selection means (select target position) 156 selects an output $A_1$ as a target position A from the vibration detector 146. In the inoperative state, the target position selection means (select target position) 156 selects an output $A_0$ as the target position A from the apex angle sensor 143, which corresponds to the parallel state of the glass plates of the variable apex angle prism 141. The angular state of the variable apex angle prism 141 is detected by the apex angle sensor 143 and is amplified by the amplifier 153. An output from the amplifier 153 is extracted as a displacement output A'. A predetermined gain is multiplied with a difference between the target position A and the displacement output A', and the product is fed back to the actuator 148, thereby maintaining the apex angle state at the target position A.

An arrangement for the method of mechanically holding the parallel state of the glass plates of the variable apex angle prism is shown in FIGS. 15A and 15B.

The holding frames 128a and 128b shown in FIG. 12 have projections. A lever 159 for maintaining the parallel state of the glass plates integrally has holding portions 160a and 160b for holding the projections of the holding frames 128a and 128b. A gear 161 is mounted on the rear end portion of the lever 159. The gear 161 is meshed with an output gear 162 of a motor 163. Upon rotation of the motor 163, the lever 159 is rotated.

FIG. 15B is a view showing the mechanism when viewed from an arrow in FIG. 15A. The position of the holding portion 160a indicates the parallel state wherein the glass plates are parallel to each other. When the holding portion 160a is located at a position indicated by the alternate long and two short dashed line, the glass plates are set in a free state. The parallel or free state can be easily detected by a combination of sensors such as a photointerrupter and a leaf switch.

When a method of optimally holding the blur suppression means at an optimal position in an inoperative state of the blur preventive apparatus is taken consideration, the following problems are posed.

1. When the method 1) is employed, power almost equal to that in an operative state of the blur preventive apparatus is wasted although the blur preventive apparatus is kept in an inoperative state.

2. When the method 1) is employed and an abrupt vibration acts on the video camera, an optimal state may not be maintained depending on the characteristics of the feedback system.

3. When the method 2) is employed, large motor noise is produced during switching between the parallel state and the free state, or collision noise between the holding portion 160 and the holding frame 128 is produced. When such noise is produced during recording in a video camera, it may be undesirably recorded.

4. When the method 2) is employed, the following drawbacks are caused. Since the stable position of the variable apex angle prism is greatly different from a predetermined position (neutral position) held by the holding means due to the gravitational influence (since the liquid inside the transparent glass plates normally receives the gravitational influence, the transparent glass plates are located in an inverted V shape), when the holding means changes from the holding state to the holding release state, or vice versa, the photographic frame is greatly moved, or the photographic frame becomes discontinuous due to the collision (during the change from the holding release state to the holding state) of the variable apex angle prism against the holding means, thereby degrading the photographic frame or damaging the holding means and the variable apex angle prism.

5. When the method 2) is employed, when the variable apex angle prism is moved to the neutral position during the change from the holding state to the holding release state (more specifically, at the start of blur suppression immediately after the release of the holding state), large instantaneous currents must be supplied to the actuators 148 and 149.

SUMMARY OF THE INVENTION

According to one aspect of the invention, there is provided an image stabilizing apparatus comprising blur suppression means moved to deflect a beam and optically perform vibration suppression, a mechanical locking member for mechanically locking the blur suppression means at a predetermined position, and an electric locking means for electrically locking the blur suppression means, wherein the electric locking member performs a locking operation during a change in locking state of the mechanical locking member such that the mechanical locking member starts locking the blur suppression means or releases the blur suppression means, thereby preventing an unnatural frame movement caused during the change in locking state of the mechanical locking member, the damage to the mechanical locking member and the blur suppression means, and wasteful power consumption.

According to another aspect of the invention, there is provided an image stabilizing apparatus comprising blur suppression means moved to deflect a beam and optically perform vibration suppression, a mechanical locking member for mechanically locking the blur suppression means at a predetermined position, an electric locking means for electrically locking the blur suppression means, and means for determining whether a video camera is set in a recording state or a non-recording state, wherein the electric locking member is used to set a locking state when the video camera is set in the recording state, and the mechanical locking member is used to set a locking state when the video camera is set in the nonrecording state, thereby preventing recording of noise produced during a locking operation in a recording mode and reducing the power consumption.

BRIEF DESCRIPTION OF THE DRAWINGS

FIG. 3 is a view showing the third embodiment according to the present invention;

FIG. 5 is a perspective view showing the detailed arrangement of a vibration detector;

FIG. 8 is a view showing the schematic arrangement of a blur preventive apparatus according to the fifth embodiment of the present invention;

FIGS. 10A, 10B, and 10C are views for explaining the schematic arrangement of a general variable apex angle prism and the like;

FIGS. 11A and 11B are views for explaining the function of a variable apex angle prism;

DETAILED DESCRIPTION OF THE PREFERRED EMBODIMENT

The present invention will be described in detail with reference to the illustrated embodiment.

Figure 1:
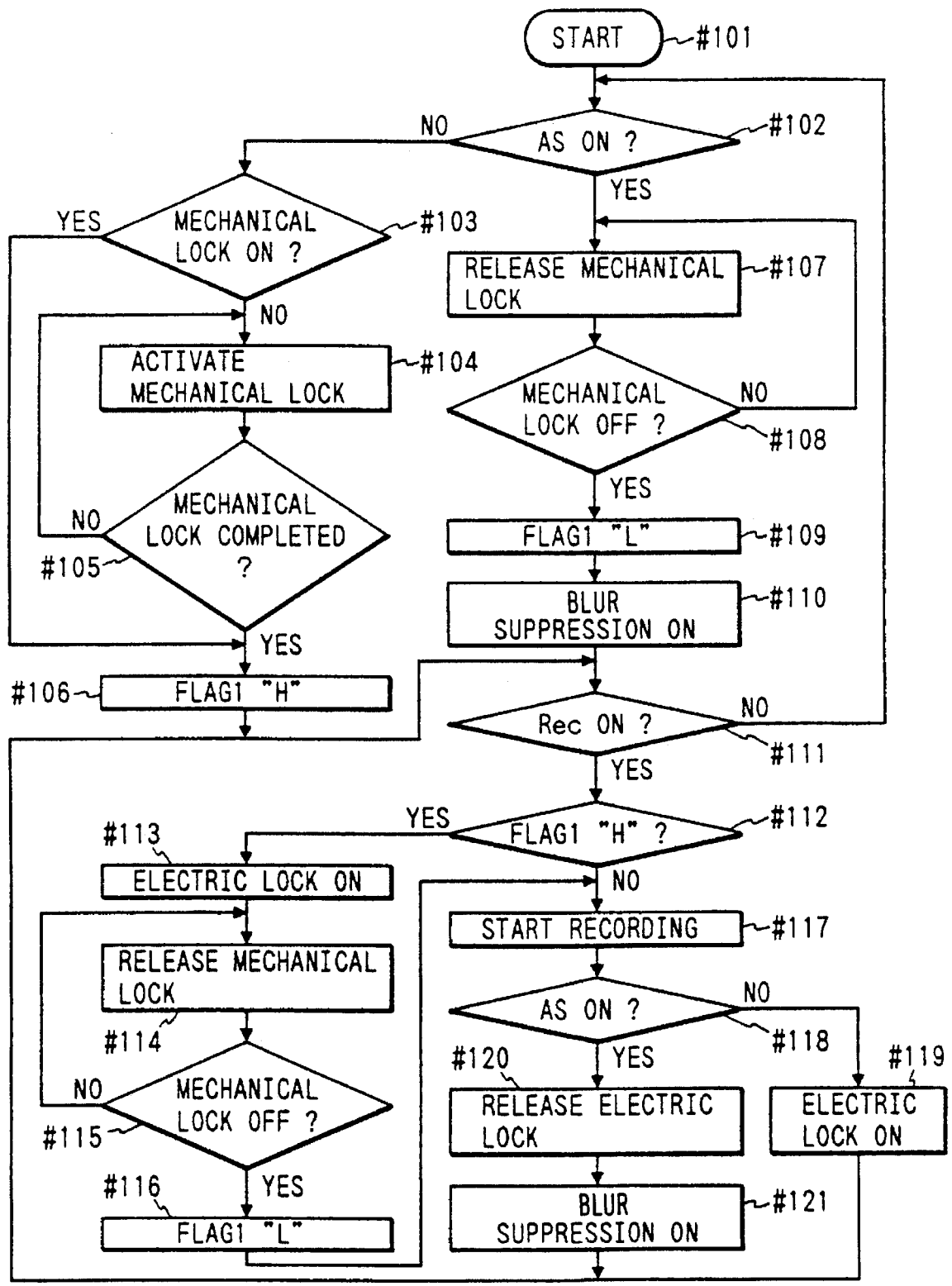
FIG. 1 is a flow chart showing the operation of the first embodiment according to the present invention.
Figure 13:
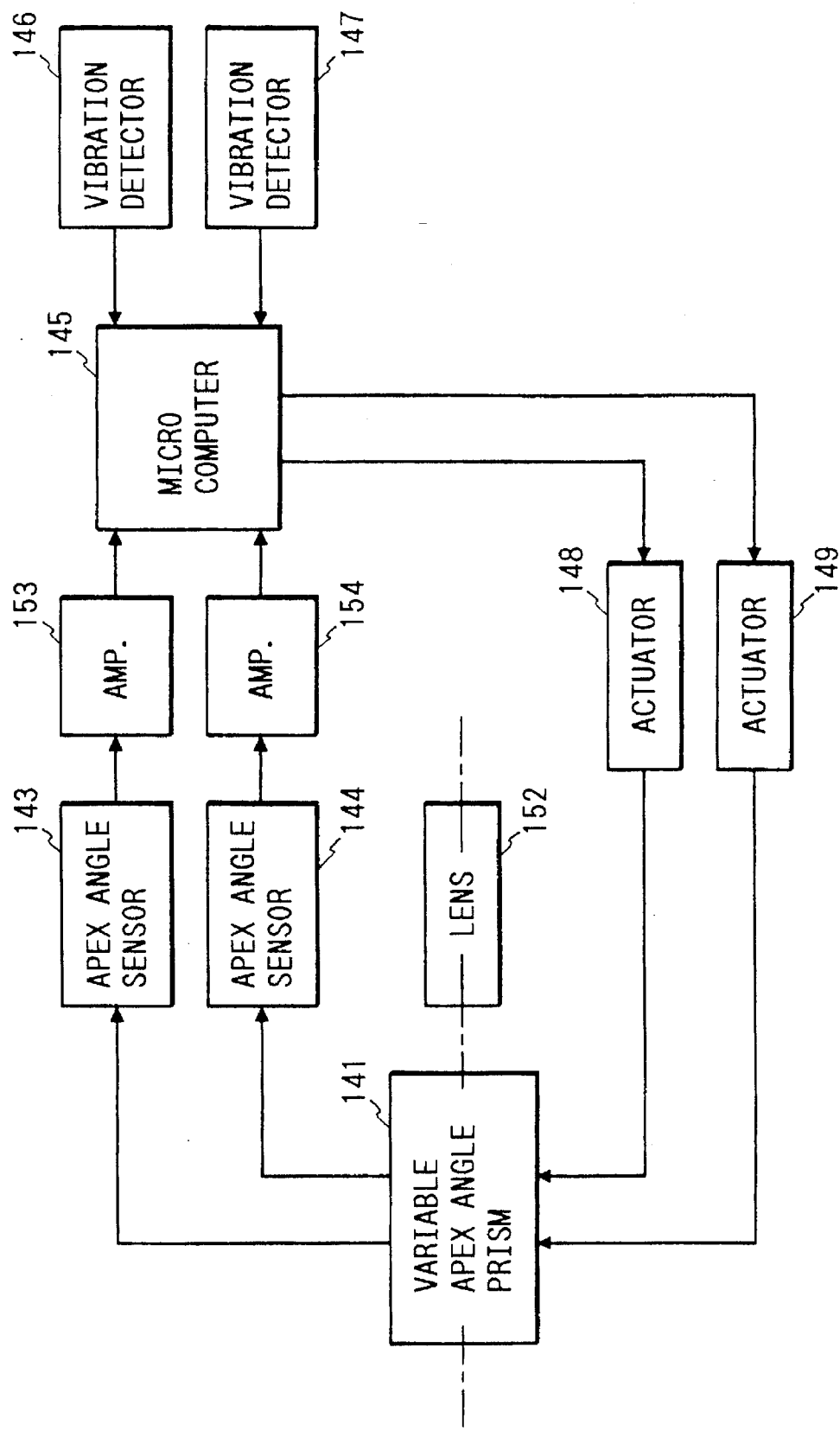
FIG. 13 is a block diagram showing the electric circuit of the blur preventive apparatus.
Figure 14:
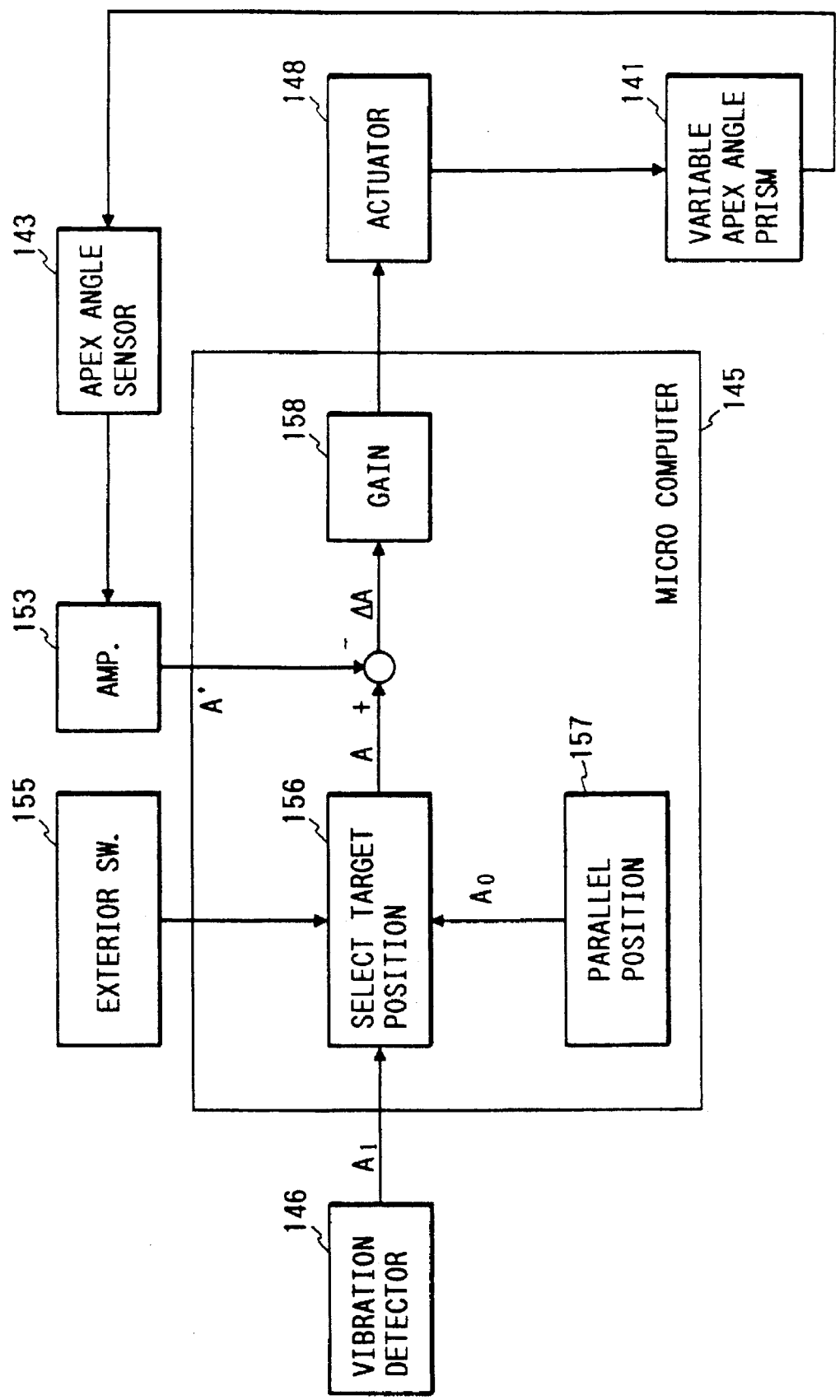
FIG. 14 is a block diagram showing the electric circuit for electrically locking the variable apex angle prism.
Figure 15A:
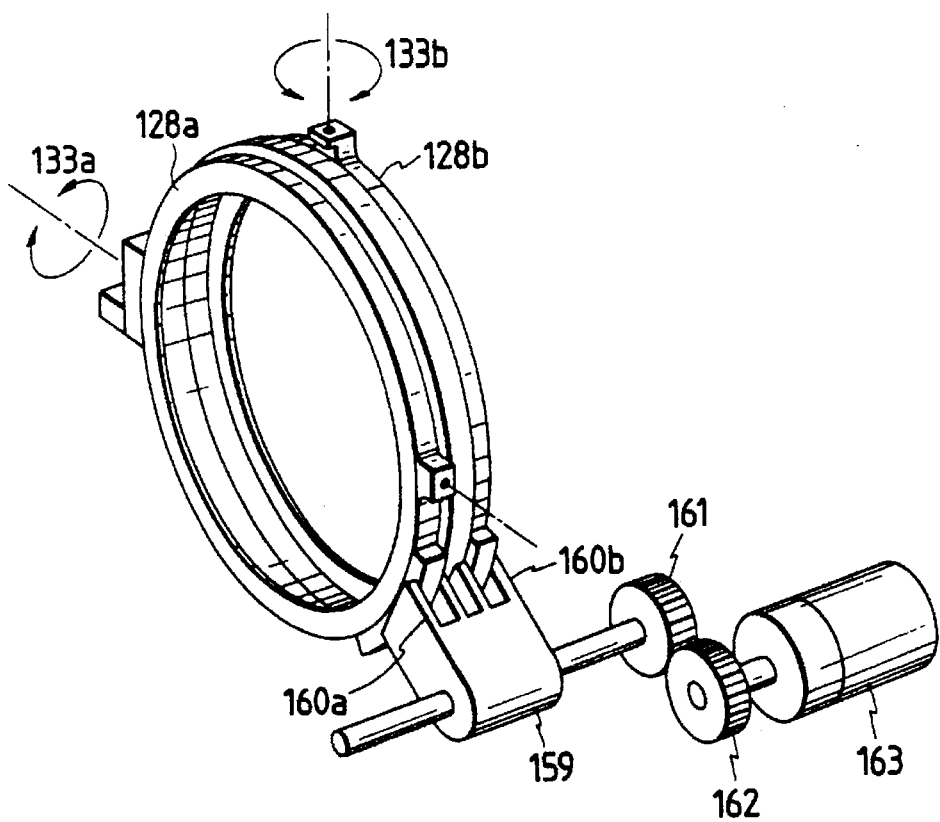
FIGS. 15A and 15B are views showing mechanical members for mechanically locking the variable apex angle prism.
Figure 15B:
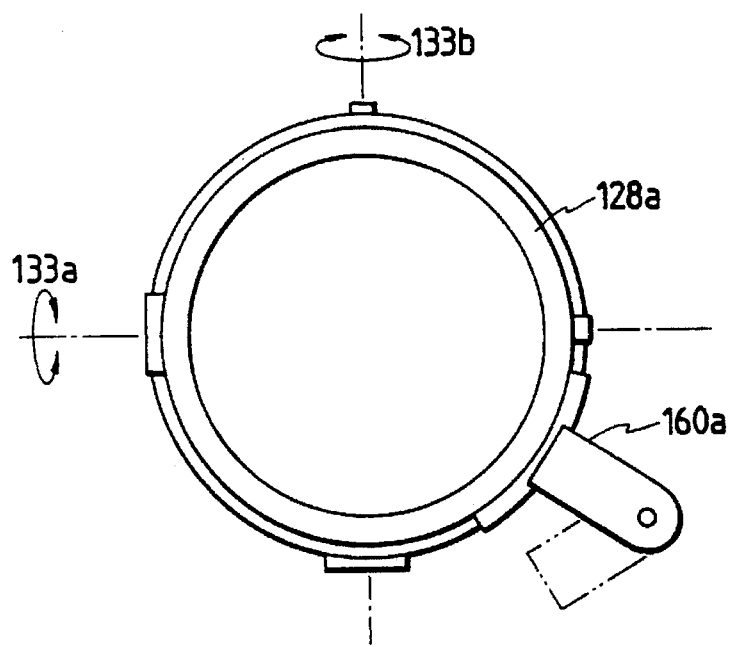

FIG. 1 is a flow chart showing the operation of a blur preventive apparatus according to the first embodiment of the present invention. A circuit arrangement for the blur preventive apparatus of this embodiment is different from that in FIG. 13 in that a status signal is fetched from a recording switch (trigger switch) of a video camera to a microcomputer 145, and a detailed description thereof will be omitted.

Prior to a description of the operation in FIG. 1, the blur preventive apparatus is represented by reference symbol AS. As a method of holding the variable apex angle prism or the like at an optimal position in the OFF state of the AS, the method 1) is called an electric lock, and the method 2) is called a mechanical lock. The electric and mechanical locks are set in the holding states when the AS is set in the ON state. The recording state of the video camera is represented by RecON. A difference between AS-ON and the electric lock ON state is caused by a difference in selection state of the target position selection means (select target position) 156 in FIG. 13. A state in which both AS-ON and the electric lock ON state are established does not basically exist (this state is temporarily set when the mechanical lock is switched to the electric lock, as will be described later).

When the main power switch of the video camera is turned on in step #101, the operation from step #102 is started.

It is determined in step #102 whether the AS is set in an ON (operative) or OFF (inoperative) state. When the main power switch is turned off independently of this routine, the state always returns to the mechanical lock ON state, and the apparatus is powered off.

If the AS-OFF is determined in step S102, it is determined in step #103 whether the mechanical lock is correctly ON. This determination is performed due to the following reason. The mechanical lock must be ON after the main power switch is turned off. However, for example, if an AC cord is accidentally unplugged from the AC outlet during the photography, the mechanical lock may be set in an OFF state. If NO in step #103, a correct mechanical lock state is obtained in steps #104 and #105. In step #106, a flag 1 representing the state of the mechanical lock is set at "H".

When the AS-ON is determined in step #102, the mechanical lock is released in steps #107 and #108. The flag 1 goes "L" in step #109, and the blur suppression (blur prevention) operation is started.

It is determined in step #111 whether the state RecON is set. Steps #102 to #111 are repeated during the RecPause (pause during recording) state.

Switching between the AS-ON and AS-OFF states in the RecPause state is always interlocked with the ON/OFF operation of the mechanical lock. Power consumption in the AS-OFF state is small. In addition, driving noise during switching of the mechanical lock is not recorded because the RecPause state is set.

When it is determined in step #111 that the RecON state is set, the state of the flag 1 is determined in step #112. If the flag 1 is set at "L", the flow advances to step #117 to start recording. Thereafter, if the AS state is kept unchanged (i.e., if the AS is set in the ON state), the flow directly returns to step #111 without going through steps #120 and #121 because the electric lock has already been released and the AS-ON state has already been set.

When the AS is turned off at a given moment during AS-ON recording, NO is established in step #118. The flow advances to step #119 to turn on the electric lock. When the electric lock is ON, the AS is OFF, as a matter of course. In this state, the mechanical lock is not actuated even during recording, and disturbing noise is not recorded.

When the RecOFF state is set, NO is established in step #111. In addition, NO is also established in step #102. Therefore, the mechanical lock is turned on in steps #103 to #105.

The first characteristic feature of the first embodiment lies in that when the AS is changed from the ON state to the OFF state during recording, the electric lock which does not produce any disturbing noise is ON (because no chromatic aberration occurs), and that after the RecPause state is set, the mechanical lock which has low power consumption is turned on. Note that the electric lock is OFF when the mechanical lock is ON.

In step #112, the flag 1 is set at "H", i.e., when a RecON command is received in the RecPause state while the mechanical lock is kept on, the flow advances to step #113.

When recording is started during the ON state of the mechanical lock, and the AS is turned on during recording, the mechanical lock must be released upon the AS-ON operation, thereby producing noise.

In step #113, the electric lock is turned on. In steps #114 to #116, the mechanical lock is released. In this manner, when the recording command is received in the AS-OFF state, and the mechanical lock is changed to the electric lock, no problem is posed even if the AS is turned on during recording (steps #120 and #121).

The second characteristic feature of the first embodiment lies in that different holding methods are set in the RecON and RecPause states even during the AS-OFF state, thereby obtaining an arrangement free from any problem, i.e., noise recording.

The second embodiment of the present invention will be described below. According to the second embodiment, the AS-ON command is refused during recording due to the following reason. When the holding method is switched as in the first embodiment upon a change from the RecPause state to the RecON state, a time loss is caused.

Figure 2:
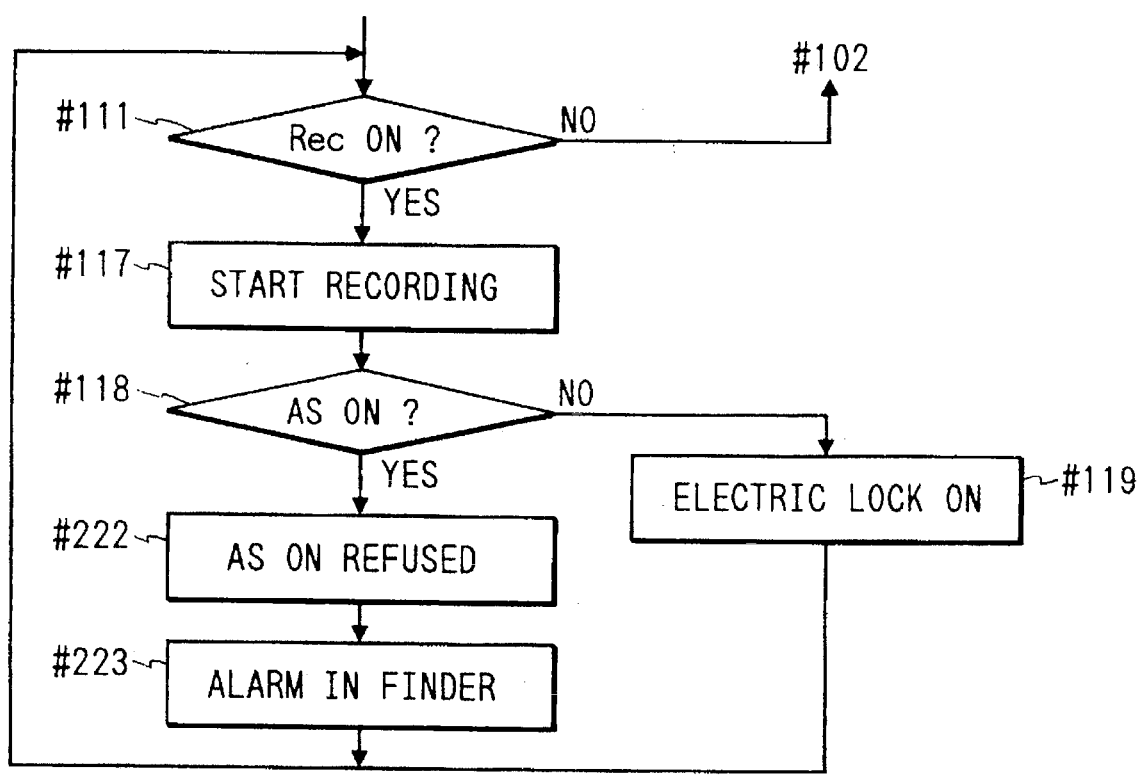
FIG. 2 is a flow chart showing the operation of the second embodiment according to the present invention.

FIG. 2 shows operations from step #111 in FIG. 1 according to the second embodiment. A change from the AS-OFF state to the AS-ON state is refused in step #222. Instead, an alarm is displayed in the finder of the video camera in step #223 in the second embodiment. When the RecPause state is then set, the lock is released in steps #107 to #109.

The third embodiment of the present invention will be described below. As soon as the AS is turned on during recording, holding is advantageously performed at the optimal position where the chromatic aberration is minimized, as described above, in favor of image quality. However, an undesirable image caused by discontinuity of a moving image may be recorded. This will be described below with reference to FIG. 3 below.

Referring to FIG. 3, time is plotted along the abscissa. The AS is turned on at time t. At this time, the apex angle of the variable apex angle prism is instantaneously changed from an angle represented by a waveform 64 to a holding position (0°) when the AS is turned on. In this case, a discontinuous image as a moving image is recorded at a portion 65.

The following arrangement is implemented to eliminate this drawback in this embodiment.

When the electric lock is to be turned on in synchronism with the change from the AS-ON state to the AS-OFF state during recording, an abrupt change in an order of 64→65→66 is not set. A change (64→67) for holding the apex angle upon the change from the AS-ON state to the AS-OFF state is set, or a gradual change in an order of 64→68→66 is set. Alternatively, after the AS-ON state is kept set until the apex angle becomes 0°, and a change in an order of 64→69→66 is then set. The change in the order of 64→67 causes degradation of image quality by the chromatic aberration. However, since the mechanical lock is turned on in the next RecPause state, no serious problem may be posed because the photographic period of a general scene is considered to be 10 seconds.

In each embodiment described above, in a video camera having an image blur preventive apparatus having an optical correction means, holding means for holding the optical correction means at an optimal position comprise an electric lock and a mechanical lock which are selectively used in the blur prevention disable state in accordance with the recording and non-recording modes of the video camera. Problems such as "wasteful power consumption" and "noise recording" can be efficiently solved. In addition, since the holding operation is performed by the mechanical lock in the blur prevention disable state, the optical correction means can be kept held in the optimal state even if an abrupt vibration acts on the video camera.

As described above, according to the first to third embodiments, there are provided an electric holding means for electrically holding an optical correction means at a predetermined position, a mechanical holding means for mechanically holding the optical correction means at the predetermined position, determination means for determining whether a video camera is set in a recording or non-recording state, and a switching means for, when a vibration prevention disable command is supplied, actuating the electric holding means as the holding means when the determination means determines the recording state, and actuating the mechanical holding means as the holding means when the determination means determines the non-recording state. The holding means for holding the optical correction means at the predetermined position in the blur prevention disable state is differently switched depending on the recording or non-recording state of the video camera.

Problems in the blur prevention disable state, that the power is wasted, the optical correction means cannot be set in an optimal state upon reception of an abrupt vibration, and noise is recorded in the recording mode, can be prevented.

The fourth embodiment of the present invention will be described below.

Figure 4:
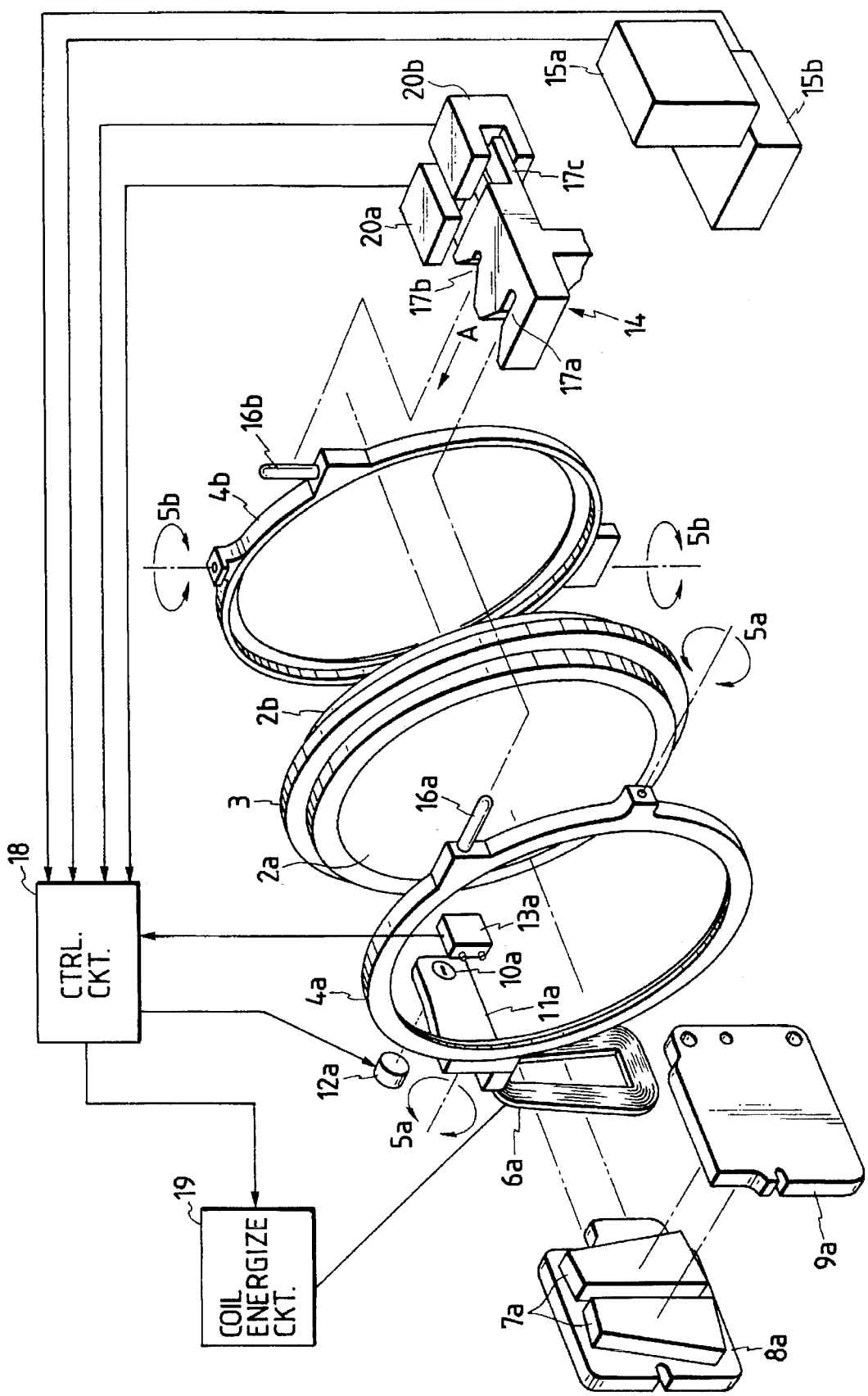
FIG. 4 is a view showing the schematic arrangement of a blur preventive apparatus according to the fourth embodiment of the present invention.

FIG. 4 is a view showing the schematic arrangement of a blur preventive apparatus according to the fourth embodiment of the present invention.

The edges of transparent plates 2a and 2b constituted by two opposite glass plates or the like are sealed by a film 3. A liquid (not shown) having a high refractive index is filled in a space defined by the transparent plates 2a and 2b and the film 3, thereby constituting a variable apex angle prism. This variable apex angle prism is clamped between frames 4a and 4b, so that the transparent plates 2a and 2b are held to be pivotal about a pitch axis 5a and a yaw axis 5b, respectively.

A flat coil 6a is fixed to one end of the front frame 4a, and permanent magnets 7a and yokes 8a and 9a are located to sandwich the flat coil 6a to constitute a closed magnetic circuit. An arm 11a having a slit 10a is located at a position opposite to the flat coil 6a on the frame 4a. A light-emitting element 12a and a light-receiving element 13a are located to oppose each other through the arm 11a. The light-emitting element 12a comprises, e.g., an infrared light-emitting element such as an IRED, and the light-receiving element 13a is a photoelectric transducer element such as a PSD whose output changes in accordance with the position of a received beam spot.

A beam emitted from the light-emitting element 12a passes through the slit 10a and is incident on the light-receiving element 13a. When the slit 10a is moved between the light-emitting element 12a and the light-receiving element 13a, the amount and direction of movement of the frame 4a can be obtained as electrical signals.

A lock lever 14 for locking the frames 4a and 4b at a neutral position (i.e., a position at which the transparent plates 2a and 2b are perpendicular to the optical axis) is supported by a member (not shown) to be movable in a direction indicated by an arrow A in FIG. 4. Fitting grooves 17a and 17b for locking pins 16a and 16b of the frames 4a and 4b are formed in the front surface of the lock lever 14.

Photointerrupters 20a and 20b for detecting the position of the lock lever 14 detect the ON/OFF state of vibration control in accordance with whether a projection 17c formed on the lock lever 14 shields the optical paths of the photointerrupters 20a and 20b.

Vibration detectors 15a and 15b for detecting vibrations in the pitch and yaw directions are mounted on a support portion of the apparatus so as to detect vibration amounts in the pitch and yaw directions of the apparatus as a whole.

The locking pins 16a and 16b are mounted on the frames 4a and 4b in 45° directions, respectively. When the lock lever 14 is moved forward toward the frames 4a and 4b, the locking pins 16a and 16b are fitted in the fitting grooves 17a and 17b, respectively, so that the positions of the frames 4a and 4b are regulated to set the variable apex angle prism in the holding state.

Although not shown, a means, constituted by a flat coil 6b, permanent magnets 7b, and yokes 8b and 9b, for generating an electromagnetic driving force, and a means, constituting by a slit 10b, an arm 11b, a light-emitting element 12b, and a light-receiving element 13b, for detecting the movement position are also arranged on the yaw side and operate in the same manner as on the pitch side.

FIG. 5 is a view showing the internal structure of each of the vibration detectors 15a and 15b.

A liquid 22 having a high specific gravity is filled inside an outer cylinder 21. Sensing blades 23 are held in the liquid 22 so as to be pivotal about a shaft 25 by a holding arm 24 fixed in the outer cylinder 21. A slit-like reflecting surface 26 is formed near the center of the sensing blades 23.

A light-emitting element 27 and a light-receiving element 28 are arranged outside the outer cylinder 21 so as to be directed toward the reflecting surface 26. A beam emitted from the light-emitting element 27 is reflected by the reflecting surface 26 and is incident on the light-receiving surface of the light-receiving element 28. Note that the light-emitting element 27 comprises, e.g., an infrared light-emitting element such as an IRED, and the light-receiving element 28 is a photoelectric transducer element such as a PSD whose output changes in accordance with the position of a received beam spot. The operation of the vibration detectors 15a and 15b each having the above arrangement will be described in order below.

When the apparatus as a whole is vibrated due to a hand vibration of a photographer who holds a camera, the outer cylinder 21, the holding arm 24, the light-emitting element 27, and the light-receiving element 28 in each of the vibration detectors 15a and 15b move together in the vibration direction. However, the liquid 22 having the high specific gravity, the sensing blades 23, and the reflecting surface 26 formed at the center of the sensing blades 23 tend to stay still due to their inertia with respect to the absolute coordinates. For this reason, a relative angle corresponding to a twist amount is formed between the outer cylinder 21 and the sensing blades 23. The position of the spot of the beam emitted from the light-emitting element 27 and reflected by the reflecting surface 26 is shifted by this relative angle on the light-receiving surface of the light-receiving element 28. A signal corresponding to this shift is output from the light-receiving element 28.

The outputs from the light-receiving element 28, i.e., the outputs from the vibration detectors 15a and 15b have values representing the magnitudes of movements of the frames 4a and 4b about the pitch axis 5a and the yaw axis 5b, respectively. These signals are multiplied with an appropriate multiplier and are converted into an apex angle displacement amount necessary for eliminating the vibration from the variable apex angle prism.

Changes in rotational angles of the opposite transparent plates 2a and 2b serving as constituent members of the variable apex angle prism, i.e., changes in apex angles of the variable apex angle prism in the pitch and yaw directions are detected by displacements of the spot position on the light-receiving surface when the beams emitted from the light-emitting elements 12a and 12b pass through the slits 10a and 10b formed in the arms 11a and 11b of the frames 4a and 4b rotated together with the opposite transparent plates 2a and 2b are incident on the vibration detectors 15a and 15b. The light-receiving elements 13a and 13b supply outputs corresponding to the movement amounts of the spot, i.e., the magnitudes of displacements (displacement amounts) of the apex angles of the variable apex angle prism to a control circuit 18.

The control circuit 18 calculates a difference between the magnitude (displacement amount) of the apex amount (calculated above) necessary for eliminating the image blur and the current magnitude of the apex angle of the variable apex angle prism and sends the difference as a driving command signal for the coil 6a (6b) to a coil energize circuit 19. The coil energize circuit 19 supplies the drive current corresponding to the coil driving command signal to energize the coil 6a (6b), thereby generating a coil driving force caused by an electromagnetic force between the permanent magnets 7a (7b).

The variable apex angle prism performs rotation about the pitch axis 5a and the yaw axis 5b by the coil driving forces and is deformed to match the magnitude of the current apex angle with that of the apex angle calculated as described above. That is, the variable apex angle prism is driven to perform blur suppression control by a feedback control system using the apex angle value calculated to suppress the vibration as the reference signal and the current apex angle value as the feedback signal.

The mechanical operation for starting/stopping blur suppression will be described below.

When blur suppression is not to be performed, the frames 4a and 4b are mechanically held, and the variable apex angle prism is locked at the center within the variable range. That is, the movement in the pitch direction is stopped by locking the frame 4a, and the movement in the yaw direction is stopped by locking the frame 4b.

The pitch-side locking pin 16a is integrally formed on the front frame 4a to be parallel to the pitch axis 5a in such a manner that the distal end of the locking pin 16a is located at a position rotated obliquely upward through 45° from the optical axis. Similarly, the yaw-side locking pin 16b is integrally formed on the rear frame 4b to be parallel to the yaw axis 5b in such a manner that the distal end of the locking pin 16b is located at a position rotated obliquely upward through 45° from the optical axis. That is, the frames 4a and 4b are arranged such that identical frames are rotated through 90° with each other and are caused to oppose back to back. Therefore, common parts can be used to reduce the cost.

The lock lever 14 is mounted to be movable in the horizontal direction, as indicated by the arrow A in FIG. 4. The lock lever 14 can be moved in the direction of the arrow A, i.e. forward with respect to the frames 4a and 4b, so that the locking pins 16a and 16b are respectively fitted in the fitting grooves 17a and 17b, thereby locking the frames 4a and 4b.

The movements of the variable apex angle prism in the pitch and yaw directions are simultaneously locked.

When the lock lever 14 is moved in a direction opposite to the direction of the arrow A to disengage the frames 4a and 4b (the locking pins 16a and 16b) from the fitting grooves 17a and 17b, the frames 4a and 4b are set free. In this state, the variable apex angle prism can be freely operated, so that blur suppression can be performed.

When blur suppression can be performed, the projection 17c ON/OFF-controls the photointerrupters 20a and 20b to cause the control circuit 18 to start/stop the blur suppression.

Figure 6:
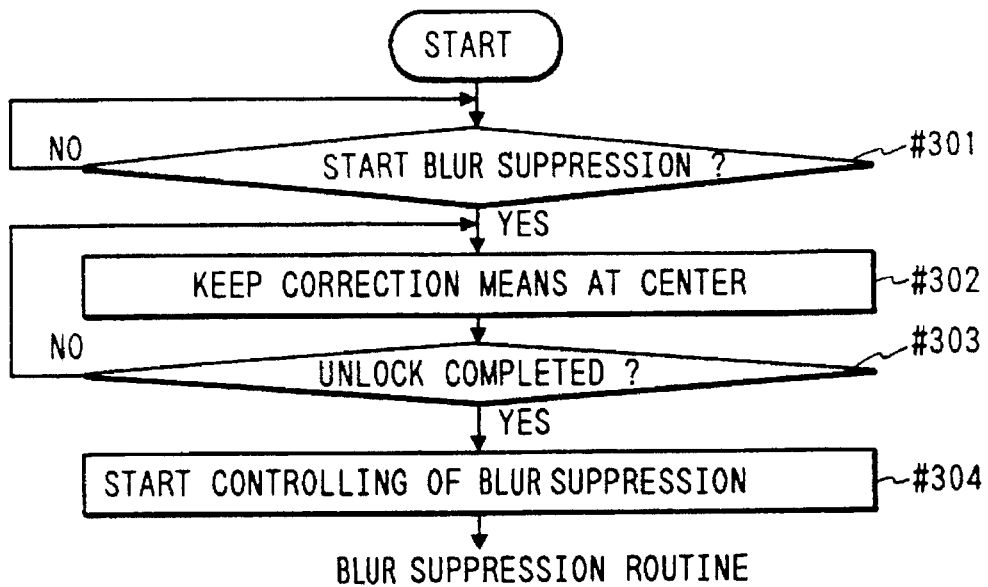
FIG. 6 is a flow chart showing a routine for starting a blur suppression operation in a control circuit.
Figure 7:
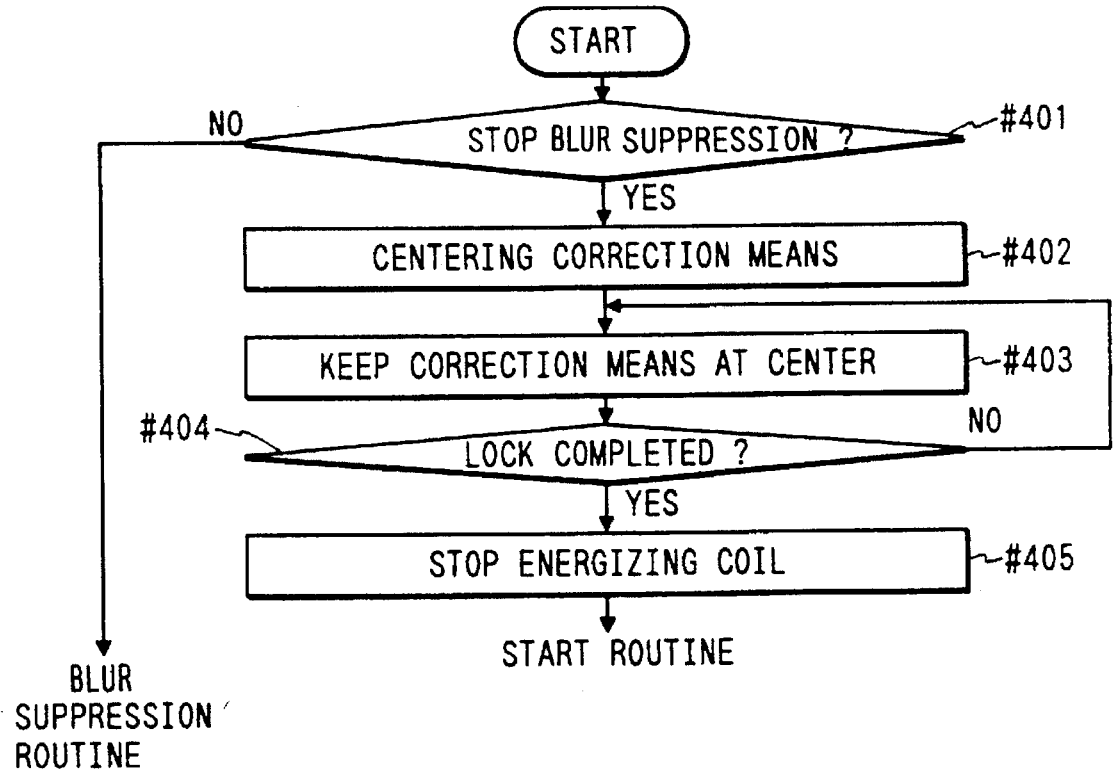
FIG. 7 is a flow chart showing a routine for stopping a blur suppression operation in a control circuit.
Figure 9A:
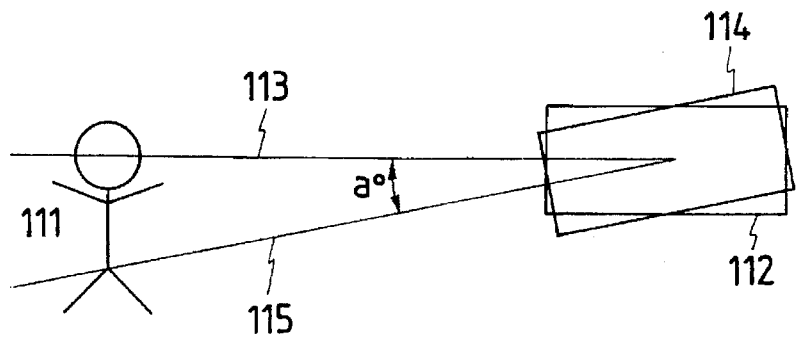
FIGS. 9A, 9B, and 9C are views for explaining the relationship between the focal length and the camera vibration angle with respect to object positions on a frame.
Figure 9B:
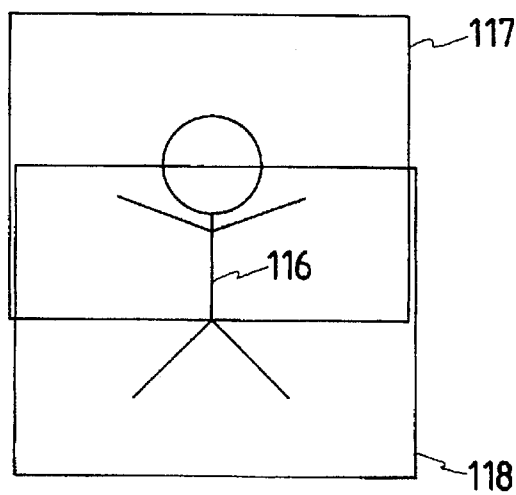
Figure 9C:
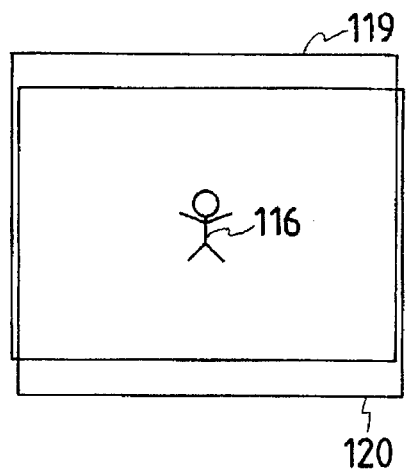
Figure 12:
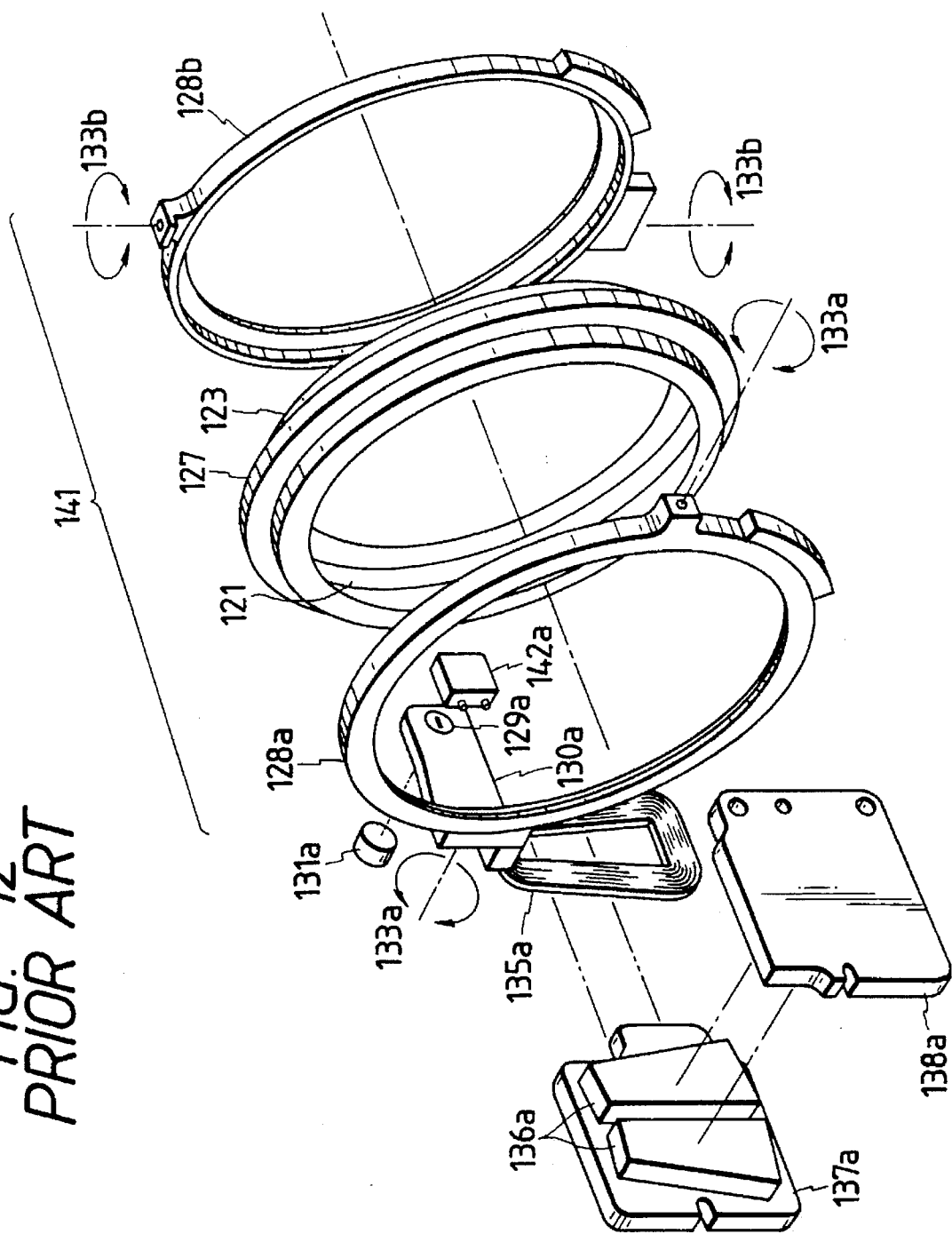
FIG. 12 is a perspective view showing the schematic arrangement of a blur preventive apparatus having the variable apex angle prism as a blur suppression means.

The sequences of the start and stop of vibration suppression in the control circuit 18 are shown in FIGS. 6 and 7, respectively.

The start of blur suppression will be described with reference to FIG. 6.

Step #301: In the variable apex angle prism locked state (mechanical lock) wherein the locking pins 16a and 16b mounted on the frames 4a and 4b are respectively fitted in the fitting grooves 17a and 17b of the lock lever 14, when the lock lever 14 is operated in the direction opposite to the direction of the arrow A, the photointerrupter 20b is turned off before the mechanical lock is released. The OFF operation of the photointerrupter 20b serves as designation of the start of blur suppression, and the flow advances to step #302.

Step #302: At this moment, the outputs from the vibration detectors 15a and 15b are not used for control. Energization of the flat coils 6a and 6b through the coil energize circuit 19 is started (electric lock: ON) to hold the variable apex angle prism serving as the optical correction means at a neutral position (i.e., the predetermined position of the lock lever 14).

Step #303: When the lock lever 14 is further operated in the direction opposite to the direction of the arrow A, the photointerrupter 20a is turned on. This ON operation of the photointerrupter 20a indicates the release of the lock.

Step #304: The normal blur suppression operation based on the outputs from the vibration detectors 15a and 15b is started.

The stop of the blur suppression operation will be described with reference to FIG. 7.

Step #401: A change from the blur suppression state by the variable apex angle prism to the variable apex angle prism locked state is realized by operating the lock lever 14 in the direction indicated by the arrow A. When this operation is started, the photointerrupter 20a is turned off before the mechanical lock is ON. The OFF operation of the photointerrupter 20a designates the stop of blur suppression, and the control circuit 18 advances to step #402.

Step #402: A centering signal is output to the coils 6a and 6b through the coil energize circuit 19 in place of the outputs from the vibration detectors 15a and 15b to start centering of the variable apex angle prism.

Step #403: The variable apex angle prism serving as the optical correction means is held at the neutral position by the above centering signal (electric lock: ON).

Step #404: When the lock lever 14 is further operated in the direction indicated by the arrow A, the photointerrupter 20b is turned on. The ON operation of the photointerrupter 20b indicates the end of locking (mechanical lock) of the variable apex angle prism by the lock lever 14. The flow advances to step #405.

Step #405: Energization of the coils 6a and 6b through the coil energize circuit 19 is stopped (electric lock: OFF) is stopped to end the blur suppression operation.

The fifth embodiment will be described below.

FIG. 8 is a view showing the schematic arrangement of a blur preventive apparatus according to the fifth embodiment of the present invention. The same reference numerals as in FIG. 4 denote the same parts in FIG. 8.

The arrangement of the fifth embodiment is different from that of the fourth embodiment in that a locking member 22 having fitting grooves 20a and 20b adapted to be engaged with locking pins 16a and 16b mounted on frames 4a and 4b is driven by a motor 21, and that the start/stop of the blur suppression operation is performed by an external operation switch (not shown).

Upon detection of the ON/OFF state of the external operation switch, the start and stop of the blur suppression in steps #301 and #401 shown in FIGS. 6 and 7 are performed. The determination operations in steps #303 and #404 are performed by a detector (not shown) for detecting an increase in motor current value upon abutment of the locking member 22.

Other operations of the fifth embodiment are the same as those of the fourth embodiment, and a detailed description thereof will be omitted.

In each of the fourth and fifth embodiments, when the state of the lock lever 14 (or the locking member 22) is changed from the locking state to the release state or from the release state to the locking state, the variable apex angle prism serving as the optical correction means is electrically locked at the neutral position (electric lock: ON). For this reason, unnecessary movements of the variable apex angle prism, which are caused by the gravity upon the start/stop of blur suppression, and collision of the variable apex angle prism against the lock lever 14 (or the locking member 22) can be prevented, thereby stabilizing the photographic frame.

Since a large drive current need not be supplied to the flat coils 6a and 6b upon completion of the change from the locking state to the lock release state of the lock lever 14 (or the locking member 22), current consumption can be kept low. In the change from the lock release state to the locking state, the variable apex angle prism can be smoothly held by the lock lever 14 (or the locking member 22), and durability of these members can be improved.

In each of the first to fifth embodiments, an optical correction means is exemplified by a member having a variable apex angle prism. However, the optical correction means is not limited to this. An image stabilizing apparatus may have an optical correction means of an inertia pendulum type. Alternatively, an image stabilizing apparatus may have an optical correction means of a shift type in which a shift operation is performed on a plane perpendicular to the optical axis to perform vibration suppression.

What is claimed is:

1. A blur suppressing apparatus comprising:
   blur suppressing means movable in an optical path, for suppressing a blur of an image transmitted along the optical path;
   mechanical lock means for mechanically locking said blur suppressing means;
   electrical lock means for electrically locking said blur suppressing means;
   an operation device for operating said mechanical lock means and said electrical lock means; and
   control means for, during an information recording operation, causing said electrical lock means to at least be activated or released independently from said mechanical lock means in accordance with an operation state of said operation device.

2. Apparatus according to claim 1, wherein said blur suppressing apparatus is disposed in an image recording apparatus, and wherein said control means includes means for causing said electrical lock means to at least be activated or released independently from said mechanical lock means in accordance with the operation state of said operation device during an image recording operation.

3. Apparatus according to claim 1, wherein said blur suppressing apparatus is disposed in a sound recording apparatus, and wherein said control means includes means for causing said electrical lock means to at least be activated or released independently from said mechanical lock means in accordance with the operation state of said operation device during a sound recording operation.

4. Apparatus according to claim 1, wherein said operation device includes means for changing-over said blur suppressing means between an active state and an inactive state.

5. Apparatus according to claim 1, wherein said control means includes means for prohibiting a change of a function of said mechanical lock means.

6. Apparatus according to claim 1, wherein said control means includes means for prohibiting a change of an operation state of said mechanical lock means.

7. Apparatus according to claim 6, wherein said blur suppressing apparatus is disposed in an information recording apparatus, and wherein said control means includes means for releasing the prohibition of the change of the operation state of said mechanical lock means in response to a halt in an information recording operation.

8. Apparatus according to claim 1, wherein said blur suppressing means includes means for refracting light.

9. Apparatus according to claim 8, wherein said blur suppressing means includes a variable apex angle prism.

10. Apparatus according to claim 8, wherein said apparatus is disposed in an information recording apparatus.

11. Apparatus according to claim 1, wherein said blur suppressing apparatus is disposed in an image recording apparatus, and wherein said operation device includes an image recording operation device.

12. A control device for use in a blur suppressing apparatus which has (i) blur suppressing means movable in an optical path for performing image blur suppression, (ii) mechanical lock means for mechanically locking said blur suppressing means, (iii) electrical lock means for electrically locking said blur suppressing means, and (iv) an operation member for operating said mechanical lock means and said electrical lock means, said apparatus comprising:
   discrimination means for discriminating an operation state of said operation member; and
   control means for, during an information recording operation, causing said electrical lock means to at least be activated or released independently from said mechanical lock means in accordance with the operation state of said operation member discriminated by said discrimination means.

13. A device according to claim 12, wherein said blur suppressing apparatus is disposed in an optical apparatus.

14. A device according to claim 12, wherein said blur suppressing apparatus is disposed in an image recording apparatus.

15. A device according to claim 12, wherein said blur suppressing means includes means for refracting light.

16. A blur suppressing apparatus for use in an information recording operation, comprising:
   blur suppressing means movable in an optical path, for suppressing a blur of an image transmitted along the optical path;
   mechanical lock means for mechanically locking said blur suppressing means; and
   control means for causing said mechanical lock means to be in a release state when an information recording operation is started regardless of whether or not said blur suppressing means is activated.

17. Apparatus according to claim 16, further comprising electrical lock means for electrically locking said blur suppressing means.

18. Apparatus according to claim 17, wherein said control means includes means for causing said electrical lock means to lock said blur suppressing means when the information recording operation is started.

19. Apparatus according to claim 17, wherein said control means includes means for changing-over an operation or non-operation state of said blur suppressing means by changing a lock state of said electrical lock means during the image recording operation.

20. Apparatus according to claim 18, wherein said control means includes means for prohibiting the changing of the lock state of said blur suppressing means when a driving state of said blur suppressing means is changed during the information recording operation.

21. Apparatus according to claim 16, wherein said blur suppressing apparatus is disposed in an image recording apparatus, and wherein said control means includes means for causing said mechanical lock means to be released when an image recording operation is started.

22. Apparatus according to claim 16, wherein said blur suppressing means is disposed in a sound recording apparatus, and wherein said control means includes means for causing said mechanical lock means to be released when a sound recording operation is started.

23. Apparatus according to claim 16, wherein said control means includes means for causing said mechanical lock means to be activated when the information recording operation is not being performed.

24. Apparatus according to claim 16, wherein said control means includes means for releasing a locking state of said mechanical lock means before the information recording operation is actually started in response to an operation which initiates the information recording operation.

25. Apparatus according to claim 16, wherein said blur suppressing means includes means for refracting light.

26. Apparatus according to claim 25, wherein said blur suppressing means includes a variable apex angle prism.

27. Apparatus according to claim 16, wherein said blur suppressing apparatus is disposed in an information recording apparatus.

28. Apparatus according to claim 16, further comprising switching means for switching-over an operation state of said blur suppressing means, said control means including means for keeping said mechanical lock means in a release state regardless of the state of said switching means.

29. A control apparatus for use in a blur suppressing device used in an image recording operation, the blur suppressing device having (i) blur suppressing means movable in an optical path to suppress a blur of an image transmitted along the optical path, and (ii) a mechanical lock means for mechanically locking said blur suppressing means, said control apparatus comprising:
a control device for setting said mechanical lock means in a released state when the information recording operation is started regardless of whether or not said blur suppressing means is activated.

30. Apparatus according to claim 29, wherein said blur suppressing device includes electrical locking means for electrically locking said blur suppressing means, and wherein said control device includes means for causing said electrical locking means to lock said blur suppressing means when the information recording operation is started.

31. Apparatus according to claim 29, wherein said blur suppressing device includes electrical locking means for electrically locking said blur suppressing means, and wherein said control device includes means for changing-over an operation or non-operation state of said blur suppressing means by changing a locking state of said electrical locking means during the image recording operation.

32. Apparatus according to claim 29, wherein said control apparatus is disposed in an optical apparatus.

33. Apparatus according to claim 29, wherein said control apparatus is disposed in an information recording apparatus.

34. Apparatus according to claim 29, wherein said control apparatus is disposed in an image recording apparatus.

35. An image blur suppressing apparatus comprising:
an image blur suppressing device which operates to suppress an image blur;
a first operation device which causes said image blur suppressing device to be inoperative by applying a mechanical force to said image blur suppressing device;
a second operation device which causes said image blur suppressing device to be inoperative by applying a non-mechanical force to said image blur suppressing device; and
a control device which permits said second operation device to operate and prevents said first operation device from operating during an information recording operation.

36. Apparatus according to claim 35, wherein said control device includes (i) receiving means for receiving a signal for causing said image blur suppressing device to be in an inoperative state, and (ii) means for causing said second operation device to be in an operational state in accordance with the signal and for causing said first operation device to be in an operational state in accordance with said signal.

37. Apparatus according to claim 36, wherein said control means includes means for causing said first operation device to be in the operational state in accordance with said signal when the information recording operation is not performed.

38. Apparatus according to claim 35, wherein said control means includes means for causing said first operation device to operate when the information recording operation is not performed.

39. Apparatus according to claim 38, wherein said control means includes means for causing both said first and second operation devices to operate when the information recording operation is not performed.

40. Apparatus according to claim 35, wherein the information recording operation includes a sound signal recording operation.

41. Apparatus according to claim 35, wherein the information recording operation includes an operation for recording image information.

42. Apparatus according to claim 35, wherein said image blur suppressing device includes optical means.

43. Apparatus according to claim 42, wherein said optical means includes means for moving in an optical path to deflect a light beam.

44. Apparatus according to claim 35, wherein said second operation device includes means for generating an electromagnetic force, and for causing said image blur suppressing device to be inoperative by applying the electromagnetic force.

45. Apparatus according to claim 35, wherein said first operation device includes means for contacting a portion of said image blur suppressing device and thereby causing said image blur suppressing device to be inoperative.

46. Apparatus according to claim 35, wherein said image blur suppressing device includes a movable member which moves in connection with the suppression of the image blur, and wherein said first operation device includes means for fixing the movable member by a mechanical operation, and wherein said second operation device includes means for fixing the movable member by an electrical operation.

47. An apparatus for use in an image blur suppressing apparatus having (i) an image blur suppressing device which operates to suppress image blur, (ii) a first operation device which causes said image blur suppressing device to be inoperative by applying a mechanical force to said blur suppressing device, and (iii) a second operation device which causes said image blur suppressing device to be inoperative by applying a non-mechanical force to said image blur suppressing device, said apparatus comprising:

a control device which causes the second operation device to be operative and causes the first operation device to be inoperative during an information recording operation.

48. Optical equipment for use with an image blur suppressing apparatus having (i) an image blur suppressing device which operates to suppress image blur, (ii) a first operation device which causes the image blur suppressing device to be inoperative by applying a mechanical force to the image blur suppressing device, and (iii) a second operation device which causes the image blur suppressing device to be inoperative by applying a non-mechanical force to the image blur suppressing device, the optical equipment comprising:

a control device which causes the second operation device to be operative and causes the first operation device to be inoperative during an information recording operation.

49. An image blur suppressing apparatus comprising:

an image blur suppressing device which operates to suppress image blur;

a first operation device which causes said image blur suppressing device to be inoperative by applying a mechanical force to said image blur suppressing device;

a second operation device which causes said image blur suppressing device to be inoperative by applying a non-mechanical force to said image blur suppressing device;

a switching device for switching said image blur suppressing device between an operational state and a non-operational state; and a control device which, during an information recording operation, changes an operational state of said second operation device independently from said first operation device in accordance with an operational state of said switching device.

50. Apparatus according to claim 49, wherein said control device comprises means for causing said second operation device to be in an operational state independently of said first operation device in accordance with said switching device causing said image blur suppressing device to be in a non-operational state during the information recording operation.

51. Apparatus according to claim 49, wherein said control device comprises means for causing at least said first operation device to be in an operational state so that said image blur suppressing device is in a non-operational state when the information recording operation is not performed in accordance with said switching device causing said image blur suppressing device to be in a non-operational state.

52. Apparatus according to claim 51, wherein said control device comprises means for causing both said first and said second operation devices to be in their operational states so that said image blur suppressing device is in a non-operational state when the information recording operation is not performed in accordance with the switching device causing said image blur suppressing device to be in a non-operational state.

53. Apparatus according to claim 49, wherein said first operation device comprises means for contacting said image suppressing device.

54. Apparatus according to claim 49, wherein said second operation device comprises means for causing said image suppressing device to be in a non-operational state by operation of an electromagnetic force.

55. Apparatus according to claim 49, wherein said switching device comprises an operational portion for switching said image blur suppressing device between the operational and non-operational states.

56. Apparatus according to claim 49, wherein said image blur suppressing device comprises a movable member for preventing image blur, and wherein said first and second operation devices each comprise means for preventing movement of the movable member.

57. Apparatus according to claim 49, wherein said image blur suppressing device comprises means for optically suppressing image blur.

58. Apparatus according to claim 49, wherein the information recording operation is an image information recording operation.

59. Apparatus according to claim 49, wherein the information recording operation is a sound information recording operation.

60. An apparatus for use with an image blur suppressing apparatus having (i) an image blur suppressing device which operates to suppress image blur, (ii) a first operation device which causes said image blur suppressing device to be inoperative by applying a mechanical force to said blur suppressing device, (iii) a second operation device which causes the image blur suppressing device to be inoperative by applying a non-mechanical force to said image blur suppressing device, and (iv) a switching device for switching the image blur suppressing device between an operational state and a non-operational state, the apparatus comprising:

a control device which, during an information recording operation, changes an operational state of the second operation device independent from the first operation device in accordance with an output of said switching device.

61. An apparatus for use with an image blur suppressing apparatus having (i) an image blur suppressing device which operates for suppressing image blur, (ii) a first operation device which causes the image blur suppressing device to be inoperative by applying a mechanical force to said image blur suppressing device, (iii) a second operation device which causes the image blur suppressing device to be inoperative by applying a non-mechanical force to said image blur suppressing device, and (iv) a switching device for switching the image blur suppressing device between an operational state and a non-operational state, said apparatus comprising:

a control device which, during an information recording operation, changes an operational state of the second operation device independent from the first operation device in accordance with an operational state of said switching device.

62. An image blur suppressing apparatus comprising:

an image blur suppressing device which operates to suppress image blur;

an operation device which causes said image blur suppressing device to be inoperative by applying a mechanical force to said blur suppressing device; and a control device which causes said operation device to be in a non-operational state when an information recording operation is started regardless of whether or not said image blur suppressing device is in an operational state when said information recording is started.

63. Apparatus according to claim 62, further comprising an additional operation device which causes said image blur suppressing device to be inoperative by applying a non-mechanical force to said image blur suppressing device.

64. Apparatus according to claim 63, wherein said additional operation device comprises means for causing said image blur suppressing device to be in a non-operational state by applying an electromagnetic force to said image blur suppressing device.

65. Apparatus according to claim 63, wherein said control device comprises means for causing said image blur suppressing device to be inoperative by an operation of said additional operation device when the information recording operation is performed.

66. Apparatus according to claim 65, wherein said image blur suppressing device comprises a movable member which moves in accordance with image blur suppression, and wherein said operation device includes means for mechanically fixing said movable member.

67. Apparatus according to claim 65, wherein said control device comprises means for causing said operation device to be in an operational state when the information recording operation is not being performed.

68. Apparatus according to claim 65, wherein said control device comprises means for causing said operation device to be in a non-operational state before an image recording operation is started.

69. Apparatus according to claim 62, wherein said operation device comprises means which operates by contacting said image blur suppressing device.

70. Apparatus according to claim 62, wherein said image blur suppressing device comprises means for optically suppressing image blur.

71. Apparatus according to claim 62, wherein the information recording operation is an image information recording operation.

72. Apparatus according to claim 62, wherein the information recording operation is a sound information recording operation.

73. An apparatus for use with an image blur suppressing apparatus having (i) an image blur suppressing device which operates for suppressing image blur, (ii) an operation device for causing said image blur suppressing device to be inoperative by applying a mechanical force to said blur suppressing device, the apparatus comprising:

a control device which causes said operation device to be in a non-operational state when an information recording operation is started regardless of whether or not the image blur suppressing device is activated.

74. An optical apparatus for use with an image blur suppressing apparatus having (i) an image blur suppressing device which operates for suppressing image blur, and (ii) an operation device for causing said image blur suppressing device to be inoperative by applying a mechanical force to said suppress image blur, the optical equipment comprising:

a control device which causes said operation device to be in a non-operational state when an information recording operation is started regardless of whether or not the image blur suppressing device is activated.

* * * * *

UNITED STATES PATENT AND TRADEMARK OFFICE
CERTIFICATE OF CORRECTION

PATENT NO. : 5,633,756
DATED : May 27, 1997
INVENTOR(S) : NAOYA KANEDA, ET AL.

Page 1 of 3

It is certified that error appears in the above-identified patent and that said Letters Patent is hereby corrected as shown below:

At [56] References Cited On the title page

FOREIGN PATENT DOCUMENTS
"A0396981  11/1990  European Pat. Off." should be deleted (duplicate).

Column 1

Line 3, change "application" to --is a continuation of application Serial No. 08/404,852, filed March 17, 1995, now abandoned, which--.

Lines 5 to 6, delete in their entirety.

Line 42, "blur" should read --vibration-- and "vibration" should read --blur--.

Column 6

Line 36, "EMBODIMENT" should read --EMBODIMENTS--.

UNITED STATES PATENT AND TRADEMARK OFFICE
CERTIFICATE OF CORRECTION

PATENT NO. : 5,633,756  
DATED : May 27, 1997  
INVENTOR(S) : NAOYA KANEDA, ET AL.

It is certified that error appears in the above-identified patent and that said Letters Patent is hereby corrected as shown below:

Column 10

Line 8, "constituting" should read --constituted--.

Line 29, "spot.The" should read --spot. ¶The--.

Column 13

Line 36, "vibration" should read --blur--.

Column 14

Line 4, "claim 1," should read --claim 4,--

Column 19

Line 18, "claim 65," should read --claim 62,--.

Line 23, "claim 65," should read --claim 62,--.

Line 27, "claim 65," should read --claim 62,--.

UNITED STATES PATENT AND TRADEMARK OFFICE
CERTIFICATE OF CORRECTION

PATENT NO. : 5,633,756

DATED : May 27, 1997

INVENTOR(S) : NAOYA KANEDA, ET AL.

It is certified that error appears in the above-identified patent and that said Letters Patent is hereby corrected as shown below:

Column 20

Line 26, "suppress image blur," should read --blur suppressing device,--.

Signed and Sealed this

Twenty-third Day of December, 1997

Attest:

BRUCE LEHMAN

Attesting Officer

Commissioner of Patents and Trademarks